United States Patent

[11] 3,612,538

| | | |
|---|---|---|
| [72] | Inventor | Ward Sievenpiper<br>Milgrove, N.Y. |
| [21] | Appl. No. | 44,171 |
| [22] | Filed | June 8, 1970 |
| [45] | Patented | Oct. 12, 1971 |
| [73] | Assignee | A-T-O Inc.<br>Cleveland, Ohio<br>Continuation-in-part of application Ser. No.<br>832,132, June 11, 1969, now abandoned. |

[54] PISTON RING SYSTEM
13 Claims, 10 Drawing Figs.

[52] U.S. Cl. .................................................. 277/165,
277/194, 277/156
[51] Int. Cl. ..................................................... F16j 9/08,
F16j 15/32
[50] Field of Search ........................................... 277/194,
193, 141, 143, 138, 165, 177, 176, 136, 137

[56] References Cited
UNITED STATES PATENTS

| 1,034,582 | 8/1912 | Campbell ..................... | 277/194 |
| 1,200,641 | 10/1916 | Muchnic ...................... | 277/193 |
| 3,473,814 | 10/1969 | Bastow ......................... | 277/188 |
| 3,218,087 | 11/1965 | Hallesy ......................... | 277/112 |

*Primary Examiner*—Samuel B. Rothberg
*Attorney*—Christel & Bean

ABSTRACT: A multiple element seal ring system for pistons and the like including first and second split rings of pressure nondeformable material, preferably glass-filled nylon, adapted to be juxtaposed in a groove. A ring of resiliently yieldable, pressure deformable material, for example neoprene, has an interference fit between the groove bottom wall and a space defined by corresponding annular recesses along the inner surfaces of the nylon rings. Connecting lugs on the deformable ring received in grooves in the nylon rings prevent relative rotation of the system rings and maintain the ring partings out of alignment.

INVENTOR.
WARD SIEVENPIPER

BY

Christel & Bean

ATTORNEYS

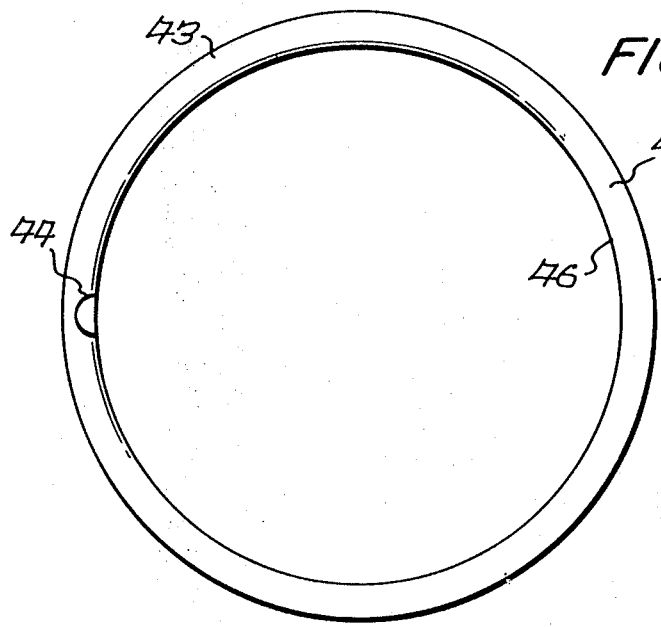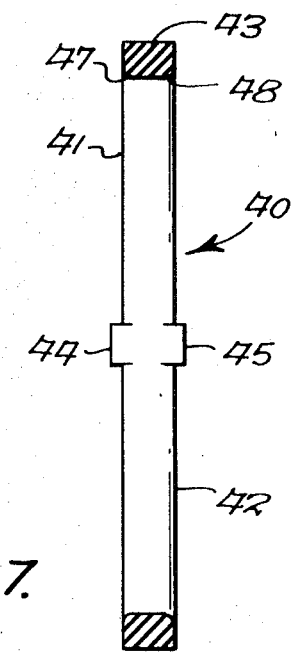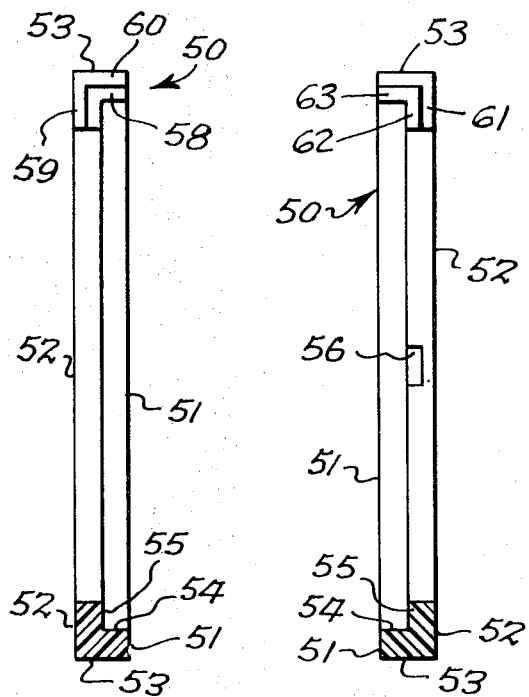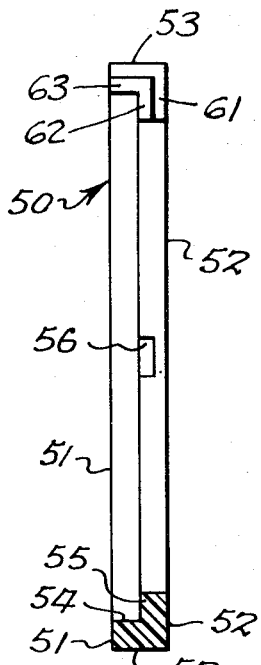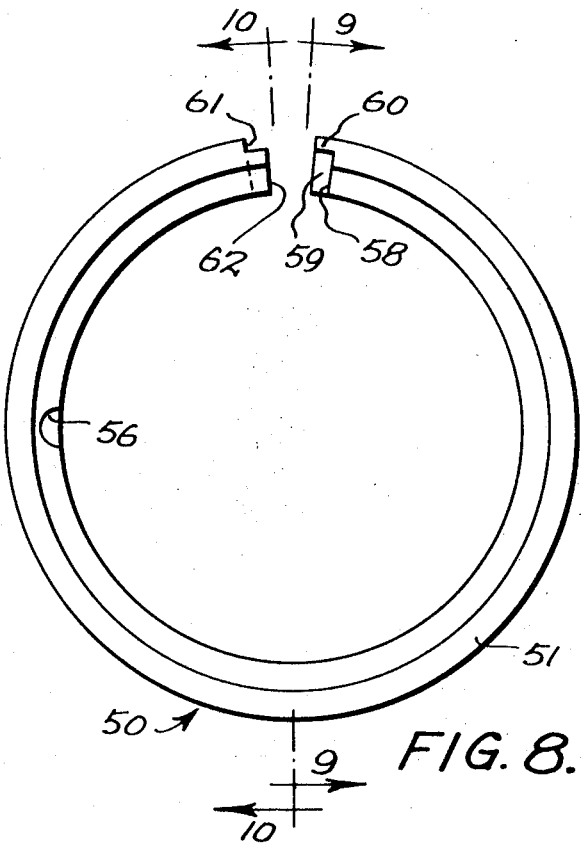

3,612,538

PISTON RING SYSTEM

CROSS-REFERENCE TO A RELATED APPLICATION

This application is a continuation-in-part of my pending application Ser. No. 832,132 entitled "Piston Ring System" filed June 11, 1969, and now abandoned.

BACKGROUND OF THE INVENTION

This invention relates to seal rings for relatively reciprocating members such as a piston reciprocable within a cylinder and, more particularly, to a multiple element seal ring system for this purpose.

Significant problems arise in providing a satisfactory seal against leakage of pressure fluid past relatively reciprocating members, for example past the pistons in high pressure hydraulic cylinders or high pressure pumps. Conventional O-rings have been widely used but have limitations, particularly when subjected to high pressure conditions. More specifically, rubber O-rings tend to become extruded around the piston and destructively worn during high pressure operation and as the piston reciprocates.

The conventional O-ring has been replaced in recent times by multiple element seal rings including both pressure deformable and nondeformable materials. However, these have not been entirely satisfactory. In some proposed constructions a pressure deformable component, such as a rubber ring, is relied upon to perform some sealing, often at low pressures, and in contacting the other part still is subject to wear. Another problem arises from the use of metal rings, which do have a significantly long wear life but are subject to galling when performing the sealing function. In addition, multiple element seal rings of the type including split rings are subject to fluid leakage or bypass, for example through the ring partings at high pressures. Fluid bypass must be prevented in many applications, such as the hydraulic cylinder of a crane hoist where drift cannot be tolerated.

SUMMARY OF THE INVENTION

It is, therefore, an object of this invention to provide a multiple element seal ring system for reciprocating machines which maintains an effective fluid seal under both high and low pressures while itself having low friction characteristics and no susceptibility to destructive pressure deformation.

It is a further object of this invention to provide such a seal ring system which includes split ring elements but which allows no bypass of fluid through the seal.

It is a further object of this invention to provide such a seal ring system which provides an effective seal against pressure acting in both or opposite directions in a reciprocating machine.

The present invention provides a multiple element seal ring system for pistons and the like including first and second split rings of pressure nondeformable material and a ring of pressure deformable material. The deformable ring functions as an expander for the two nondeformable rings in urging the latter into an effective sealing contact with the surface to be sealed. The deformable ring also seals against bypass of fluid through the clearance existing between the ring system and the groove walls. The nondeformable rings are of a material and construction which enhances their sealing efficiency as well as structural rigidity. The deformable ring is connected to the nondeformable rings so as to prevent relative rotation and thus maintain the ring partings out of alignment.

The foregoing and additional advantages and characterizing features of the present invention will become clearly apparent from the ensuing description together with the included drawing.

BRIEF DESCRIPTION OF THE DRAWING FIGURES

FIG. 6 is an elevational view of an alternative form of the expander member taken along its axis;

FIG. 7 is a sectional view thereof taken about on line 7—7 in FIG. 6;

FIG. 8 is an elevational view of an alternative form of one ring component of the seal ring system of the present invention having a lap joint construction at the parting thereof;

FIG. 9 is a sectional view thereof taken about on line 9—9 in FIG. 8; and

FIG. 10 is a sectional view thereof taken about on line 10—10 in FIG. 8.

DETAILED DESCRIPTION OF THE ILLUSTRATED EMBODIMENTS

Figure 1:
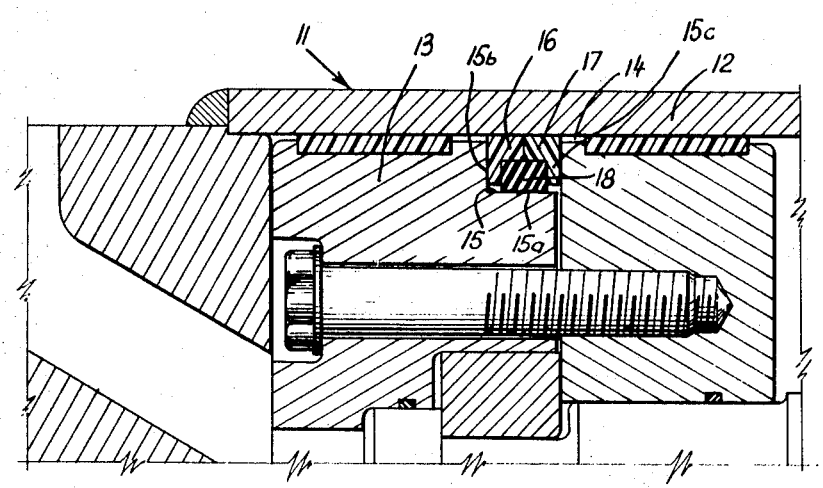
FIG. 1 is a longitudinal quarter-sectional view of a portion of a hydraulic cylinder equipped with a seal ring system of the present invention.

FIG. 1 shows a seal ring system provided by this invention as it would appear in use, for example in combination with a hydraulic cylinder. In this particular illustration one seal ring system, designated 10, is shown in a hydraulic cylinder 11 which includes, briefly, a sleeve 12 and piston 13 reciprocable therein. In this particular illustration piston 13 includes two parts bolted together but the seal ring provided by the present invention can be used with both unitary and multiple element pistons. A small gap or clearance 14 exists between sleeve 12 and piston 13 along which gap sleeve type bearings can be positioned in spaced relation as shown. As shown in FIG. 1, piston 13 includes one groove 15 adapted to receive seal ring system 10, but additional grooves and corresponding seal ring system can of course be included in piston 13. Groove 15 has a bottom wall 15a and spaced-apart sidewalls, 15b, 15c.

Seal ring system 10 of the present invention includes first and second split rings 16 and 17, respectively, of pressure nondeformable material such as synthetic plastic. Rings 16, 17 are adapted to be juxtaposed in groove 15, and each of the rings 16, 17 has a radial thickness less than the distance between groove bottom wall 15a and the inner surface of sleeve 12 which may be viewed as the surface to be sealed. In addition, the combined axial width of rings 16, 17 is less than the axial width of groove 15.

Seal ring system 10 also includes a ring 18 of pressure deformable material, such as rubber, adapted to be positioned between groove bottom wall 15a and rings 16, 17 and ring 18 is received in an annular space defined by corresponding annular shouldered recesses provided along the inner surface of rings 16, 17. By virtue of this arrangement, ring 18 urges rings 16, 17 radially outwardly so that the outer surfaces thereof are maintained in effective sealing contact with the inner surface of sleeve 12.

Figure 2:
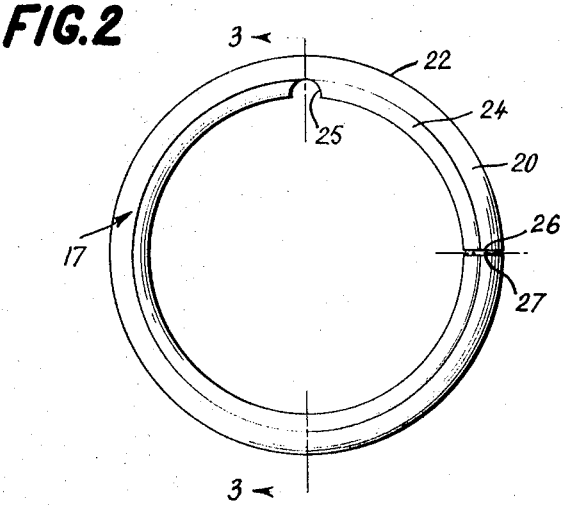
FIG. 2 is an elevational view of one ring component of the seal ring system shown in FIG. 1.
Figure 3:
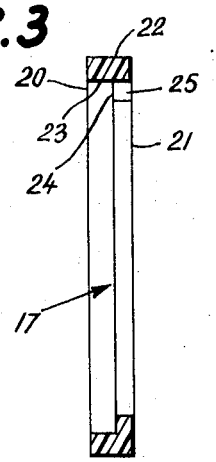
FIG. 3 is a sectional view thereof taken about on line 3—3 in FIG. 2.

Referring now to FIGS. 2 and 3 there is seen a preferred form of one of the rings 16, 17 shown in FIG. 1, for example ring 17. The orientation of ring 17 shown in FIG. 3 is a correspondence with that of its assembled position shown in FIG. 1. Ring 16 would be of identical construction and simply oriented in an opposite or 180° rotational position relative to that shown in FIG. 3 so as to correspond to its assembled position shown in FIG. 1. In other words, ring 16 would simply face in the opposite direction. Rings 16, 17 preferably are formed from the polyamide known as Nylon which is provided with a filler including glass fibers in an amount constituting about 30 percent by weight of the ring material and molybdenum disulfide in an amount constituting about 5 percent by weight of the total ring material. The glass fibers add strength to the Nylon, to lengthen its wear life, and the molybdenum disulfide adds lubricity. These weight proportions of filler material are preferred, but addition of glass fibers in a range of about 12 to 30 percent and of molybdenum disulfide in a range of about 2 to 5 percent by total weight will produce satisfactory results.

Nylon is a preferred material because of its nongalling characteristic which gives it a primary advantage over cast iron in piston rings. Nylon also has the capability of absorbing metallic impurities present in hydraulic fluid which would otherwise score and destroy the cylinder. In addition, Nylon is preferred because when provided with the appropriate filler it exhibits thermosetting behavior, becoming permanently hard and rigid when heated or cured. Once cured, the Nylon was found to remain stable up to a temperature of about 400° F. and to a pressure of around 4000 p.s.i., these being well above the temperature and pressure conditions normally encountered. While Nylon is preferred, other synthetic materials which have similar thermosetting properties and which do not exhibit "cold flow" under the temperatures and pressures normally encountered can, of course, be employed in the seal ring system of this invention.

Referring now to FIG. 3, it is seen that ring 17 has parallel axial end faces 20, 21 and an outer bearing surface 22, which end faces meet bearing surface 22 at sharp, right angle edges. Ring 16 likewise has parallel axial end faces meeting an outer bearing surface at sharp, right angle edges. The purpose of this construction of rings 16, 17 is to provide an effective wiping contact between the outer bearing surfaces 22 thereof and the inner surface of cylinder 12 to be sealed.

Each of the Nylon rings 16, 17 preferably is molded to provide a protective skin against moisture and temperature. Machining of Nylon breaks this skin and renders the material subject to deformation under adverse conditions of temperature and moisture.

Each of rings 16, 17 is provided with an annular recess along the inner surface thereof and along the axial end face which is opposite the corresponding piston groove sidewall when the ring is in assembled, operative position. Referring now to FIG. 3, ring 17 is provided with an annular recess defined by surface 23 which is concentric with the ring outer bearing surface 22 and by surface 24 which is parallel with axial end faces 20, 21. Ring 16 likewise is provided with an annular recess defined by a surface concentric with the ring outer bearing surface and by surface which is parallel with respect to the axial and faces thereof.

Each of rings 16, 17 is provided with a groove such as the semicircular recess or aperture shown at 25 in FIG. 3, extending through end face 21 from the recess defined by surfaces 23, 24 about an axis disposed generally perpendicular with respect to the plane of ring 17. An identical groove or semicircular aperture is provided in ring 16 at a similar location. In addition, each of the rings 16, 17 is split in a manner defining relatively straight and parallel edges, such as shown at edges 26, 27 in FIG. 2. Groove 25 is positioned on each ring so that the center thereof is angularly displaced from the gap defined by edges 26, 27 a distance of 90° for a purpose to be described. Moreover, rings 16, 17 are molded so that the edges 26, 27 provide a minor gap clearance which is reduced to zero when the ring system is in use at operating temperatures which cause a slight expansion of rings 16, 17.

Figure 4:
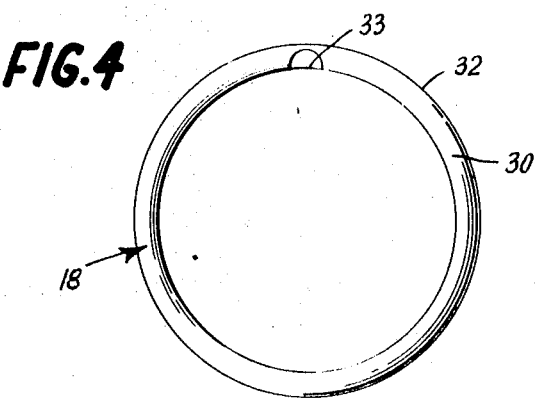
FIG. 4 is an elevational view of the expander member of the seal ring system shown in FIG. 1 taken along its axis.
Figure 5:
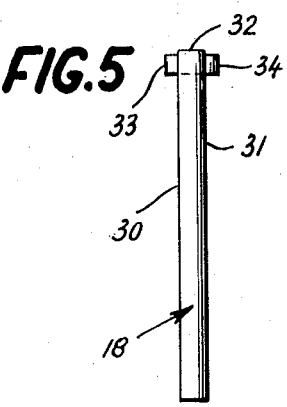
FIG. 5 is an elevational view thereof taken along a radius.

FIGS. 4 and 5 shown in detail ring 18 of resiliently yieldable, pressure deformable material which is included in seal 10. Ring 18 preferably is formed from Neoprene and functions as an expander for rings 16, 17. As shown most clearly in FIG. 5, ring 18 is formed so as to have parallel axial end faces 30, 31 which meet an outer or bearing surface 32 thereof at sharp, right-angle edges. In addition, ring 18 is provided with lug members 33, 34 on end faces 30, 31 respectively. In preferred form, ring 18 is molded so that lugs 33, 34 are integral therewith, but the lugs could be provided separately on ring 18. Lugs 33, 34 are shaped to complement and fit grooves 25, and extend from the same position on opposite sides of ring 18, in opposite directions along the same axis.

When rings 16, 17 are assembled together with ring 18 in a piston groove, as shown in FIG. 1, lugs 33, 34 of ring 18 are received in corresponding grooves or apertures 25 in rings 16, 17. By virtue of this arrangement the three components of seal ring system 10 are held against relative rotation. In addition, rings 16, 17 when assembled as shown in FIG. 1 are oriented so that the gaps or partings between the ends 26, 27 thereof are relatively displaced 180°. With this arrangement the ring gaps or partings are maintained out of alignment whereby the gap of each rings abuts an uninterrupted surface of the other and one potential fluid bypass path through seal 10 is eliminated effectively.

It should be noted that the particular arrangement of lugs 33, 34 on ring 18 and corresponding grooves or semicircular apertures in rings 16, 17 while preferred is merely illustrative of connecting arrangements which can be utilized in a system of this invention. For example, instead of separate grooves being provided in rings 16, 17 the respective gaps or partings thereof could be utilized for receiving corresponding lugs from ring 18, in which case lugs would be provided on the opposite axial end faces of ring 18 and would be displaced about 180° to relative to each other. In a addition such lugs would be relatively thin so as to be received easily in the corresponding ring partings.

When rings 16, 17 and 18 are assembled together and positioned in a piston groove, as shown in FIG. 1, the system 10 maintains an effective fluid seal under both high and low pressures while itself having low friction characteristics and no susceptibility to destructive pressure deformation. Ring 18 has an interference fit with both groove bottom wall 15a and the inner surfaces 23, 24 of the recesses in rings 16, 17. Ring 18 thus functions as an expander for rings 16, 17, urging the outer or bearing surfaces 22 thereof into fluidtight, sliding contact with the surface to be sealed, i.e. inner wall of sleeve 12. The fact that the axial end faces and outer bearing surfaces of rings 16, 17 meet at sharp right-angle edges enhances this sealing contact and provides also an effective operative wiping contact.

In addition, deformable ring 18 seals the small gap or clearance existing between groove bottom wall and the inner surfaces of rings 16, 17. This sealing action results by virtue of the interference fit and is increased as the operating fluid pressure increases.

As seen in FIG. 1 the outer axial end faces of rings 16, 17, i.e. those end faces in proximity to the corresponding groove sidewalls 15b, 15c have a radial dimension slightly less than the distance from the groove bottom wall 15a to the inner surface of sleeve 12. As a result, the gap or clearance between rings 16, 17 and groove bottom wall 15a is relatively small. This, in turn, prevents "nibbling" of neoprene ring 18 into the gap which might otherwise occur if the gap were sufficiently large.

This arrangement also provides rings 16, 17 with end surfaces of maximum area exposed to axial loading caused by fluid pressure and hence increases the overall structural rigidity of the system 10. The plastic material accordingly is better able to resist "cold flow" in response to high fluid pressure. Moreover, this relatively large exposed area of rings 16, 17 enhances the effectiveness of seal 10 in contaminated hydraulic systems. For a hydraulic system to effectively handle contaminated fluids, the width of gap or clearance 14 between piston 13 and cylinder 12 should be relatively large. The significantly large exposed area of rings 16, 17 increases the structural rigidity of system 10 against the increased axial stress resulting from the larger gap or clearance and also more surface area of plastic material can be exposed to the fluid to absorb the contaminating particles.

The rings 16, 17 being formed preferably from Nylon with glass fibers and molybdenum disulfide filler are especially resistant to destructive wear. The nondeformable rings 16, 17 being of this reinforced material thus can have a wear life significantly longer than nondeformable rings heretofore available while at the same time performing a sealing function. As a result, rings 16, 17 of nondeformable material can be used for sealing at all times and it is no longer necessary to alternately employ the deformable and nondeformable rings for sealing to prolong the wear life of the synthetic plastic material.

The operation of seal ring system 10 can be understood more clearly by assuming that axial fluid pressure is acting from the right-hand direction in FIG. 1. Fluid pressure initially is incident on axial end face 21 of ring 17 causing the entire system 10 to move slightly axially to the left within groove 15. The degree of axial movement will be small due to the relatively small clearance between system 10 and the opposite side walls of groove 15. This slight axial movement is sufficient, however, to allow fluid to enter the gap or clearance between ring 17 and groove bottom wall 15a and thus act on deformable Neoprene ring 18. Ring 18 thus expands in both radial directions and also in an axial direction to the left in FIG. 1. As a result, rings 16, 17 are urged radially outwardly into firmer sealing contact with the inner surface of sleeve 12. The seal between ring 18 and groove bottom wall 15a is made tighter. In addition, the axial end face of ring 16 is urged into firmer contact with groove sidewall 15b by the axial expansion of ring 18. Because the surface area of ring 16 under such axial stress is relatively large, and several times the peripheral portion of end face 21 facing clearance 14, the system is able to effectively resist cold flow into such clearance.

By proceeding through a similar analysis, one can see that system 10 seals in an equally effective manner against fluid pressure acting from the opposite direction. Because of the characteristics thus described, seal ring system 10 is especially suited for applications where no bypass of fluid can be tolerated, as in a hydraulic cylinder for crane hoists. The system 10 is easy and economical to manufacture, especially since rings 16, 17 while oppositely oriented, are identical and can be formed by the same mold.

FIGS. 6 and 7 show an alternative form of the expander ring, here designated 40, of pressure deformable material, preferably Neoprene. Like expander 18, ring 40 is formed so as to have parallel axial end faces 41, 42 which meet an outer or bearing surface 43 thereof at sharp, right-angle edges. Also like expander 18, ring 40 is provided with lug members 44, 45 on end faces 41, 42 respectively. In preferred form, ring 40 is molded so that lugs 44, 45 are integral therewith, but the lugs could be provided separately on ring 40. Lugs, 44, 45 are shaped to complement and fit grooves provided in corresponding rings which together with expander 40 comprise a seal ring systemlike system 10, and extend from the same position on opposite sides of ring 40, in opposite directions along the same axis.

Ring 40 has an inner surface 46 generally parallel to outer surface 43 which meets axial end faces 41 and 42 at rounded edges 47 and 48, respectively. The provision of rounded inner edges 47 and 48 prevents extrusion of ring 40 which otherwise might occur under adverse operating conditions, particularly extremely high pressure acting on the seal ring system of which ring 40 forms a part. The rounding of edges 47 and 48 in effect removes the material of expander 40 which otherwise would be subject to nibbling or be extruded along the gap between the seal ring system and the bottom surface of the piston groove in which the seal ring system is positioned.

FIGS. 8-10 illustrate a lap joint construction which alternatively can be provided on the split rings of pressure nondeformable material included in the seal ring system of the present invention. A ring 50 shown in FIGS. 8-10 is of a construction similar to that on one of the rings shown in FIGS 1-3, for example ring 17. Ring 50 of course would be included in a seal ring system with another ring of identical construction oriented in an opposite position just as ring 16 is so positioned relative to ring 17. Ring 50 is of the same material as rings 16 and 17, that is Nylon provided with a filler including glass fibers in an amount constituting about 30 percent by weight of the ring material and molybdenum disulfide in an amount constituting about 5 percent by weight of the total ring material. Preferably, ring 50 is molded to provide a protective skin against moisture and temperature.

Ring 50 has parallel axial end faces 51, 52 shown in FIGS 8-10 and an outer bearing surface 53, which ends faces meet bearing surface 53 at sharp, right-angle edges. Referring to FIGS 9 and 10, it is seen that ring 50 is provided with an annular recess defined by a surface 54 which is concentric with the ring outer bearing surface 53 and by a surface 55 which is parallel with axial end faces 51, 52. The ring which is the companion of ring 50 in a completed seal ring system likewise is provided with an annular recess defined by a surface concentric wit the ring outer bearing surface and by a surface which is parallel with respect to the axial end faces thereof. In addition, ring 50 is provided with a groove such as the semicircular recess or aperture shown at 56 in FIG. 8, extending through end faces 52 from the recess defined by surfaces 54, 55 about an axis disposed generally perpendicular with respect to the plane of ring 50. An identical groove or semicircular aperture is provided in the companion ring at a similar location.

In the split ring construction of this embodiment of the present invention the parting of ring 50 is provided with a lap joint construction which serves to inhibit fluid leakage. Referring now to FIGS. 8 and 9, ring 50 is parted by a surface 58 which is located in a plane disposed perpendicular with respect to the planes of axial end faces 51 and 52. A generally L-shaped lap joint member including portions 59 and 60 which meet at a right angle extends outwardly a slight distance from surface 58. Likewise and as shown in FIGS. 8 and 10, ring 50 includes an opposed, generally parallel surface 61 from which a complementary and generally L-shaped lap joint member including right angled portions 62 and 63 extends. The lap joint members are disposed and positioned on the respective surfaces 58 and 61 so as to be in side-by-side mating relationship when the ring parting is reduced to zero. Ring 50 is a one-piece construction molded so that surfaces 58 and 61 and the corresponding lap joint constructions provide a minor gap clearance which is reduced to zero when the ring system is in use at operating temperatures which cause a slight expansion of the ring. The ring employed as a companion of ring 50 in a seal ring system is, of course, provided with an identical lap joint construction.

The lap joint construction of the present invention provides a seal at the ring parting which inhibits fluid leakage therethrough. Nibbling and erosion of the pressure deformable expander member can occur under certain adverse operating conditions when the pressure of operating fluid leaking through the ring parting or gap tends to push the expander into the gap between the ring system and the bottom wall of the groove in which it is positioned. The lap joint construction of the present invention functions to reduce this flow and to shield the expander member from the flow.

Accordingly, it is seen that the present invention accomplishes its intended objects. While the invention has been described with specificity, this has been done by way of illustration without thought of limitation.

I claim:

1. A ring assembly for sealing against pressure leakage past the adjacent surfaces of relatively reciprocable members, one of which members is provided with a groove having sidewalls and a bottom, the other of which members has a surface to be sealed, said ring assembly comprising:

a. first and second split rings of pressure nondeformable material adapted to be juxtaposed in the groove, each of said rings having a radial thickness less than the distance between the bottom of the grooves and the surface to be sealed, the combined axial width of said first and second rings being less than the axial width of said groove;

b. a ring of pressure deformable material adapted to be positioned between the groove bottom wall and said first and second nondeformable rings, said deformable ring having a radial thickness less than the distance between the bottom of the groove and the surface to be sealed; and c. connecting means between said deformable ring and said nondeformable rings for preventing relative rotation of said nondeformable and deformable rings.

2. The ring assembly as defined in claim 1 wherein the axial end faces and the outer surface of each of said first and second nondeformable rings meet at corresponding right angle edges.

3. The ring assembly as defined in claim 1 wherein said deformable ring is formed from Neoprene.

4. The ring assembly as defined in claim 1 wherein said first and second nondeformable rings are formed from the polyamide known as Nylon.

5. The ring assembly as defined in claim 4 wherein said first and second nondeformable rings include, in addition to Nylon, filler material in a proportion by weight of about 25–30percent glass fibers and about 5 percent molybdenum disulfide.

6. The ring assembly as defined in claim 1 wherein each of said first and second nondeformable rings is provided with an annular recess along the inner surface thereof the axial end face thereof opposite the corresponding groove sidewall.

7. The ring assembly as defined in claim 6 wherein said deformable ring is received in the annular space defined by said annular recesses in said first and second rings and wherein said deformable ring is in contact with the bottom of the groove.

8. The ring assembly as defined in claim 7 wherein said deformable ring has an interference fit both with the bottom wall of the groove and with said first and second nondeformable rings whereby the outer surfaces of said first and second rings are urged into contact with the surfaces to be sealed and whereby said deformable ring is in sealing engagement with the groove bottom wall.

9. The ring assembly as defined in claim 1 wherein said connecting means comprises lug members on opposite axial faces of said deformable ring and corresponding openings in said first and second rings adapted to receive said lugs.

10. The ring assembly as defined in claim 9 wherein said openings are provided at a point on said rings circumferentially displaced 90° from the gap provided by the split therein.

11. The ring assembly as defined in claim 3 wherein said deformable ring has parallel axial end faces, an outer bearing surface which meets said axial end faces at right angle edges and an inner surface generally parallel to said outer surface and meeting said axial end faces at rounded edges.

12. The ring assembly as defined in claim 1 wherein each of said nondeformable rings are parted at opposed generally parallel surfaces each having a generally L-shaped lap member extending therefrom, said lap members being disposed so as to be in side-by-side mating relationship when the ring partings are urged together.

13. In combination with a hydraulic cylinder including a piston relatively reciprocable therein and provided with a circumferential groove having sidewalls and a bottom, a ring assembly for sealing against pressure leakage past the adjacent surfaces of said relatively reciprocable piston and cylinder, said ring assembly comprising:

a. first and second split rings of pressure nondeformable material adapted to be juxtaposed in said groove, each of said rings having a radial thickness less than the distance between the bottom of said groove and the surface of said cylinder, the combined axial width of said first and second rings being less than the axial width of said groove;

b. a ring of pressure deformable material adapted to be positioned between the groove bottom wall and said first and second nondeformable rings, said deformable ring having a radial thickness less than the distance between the bottom of the groove and the surface to be sealed; and c. connecting means between said deformable ring and said nondeformable rings for preventing relative rotation of said nondeformable and deformable rings.